(12) United States Patent
Twelves, Jr. et al.

(10) Patent No.: US 9,823,143 B2
(45) Date of Patent: Nov. 21, 2017

(54) ADDITIVELY GROWN ENHANCED IMPACT RESISTANCE FEATURES FOR IMPROVED STRUCTURE AND JOINT PROTECTION

(71) Applicant: United Technologies Corporation, Hartford, CT (US)

(72) Inventors: Wendell V. Twelves, Jr., Glastonbury, CT (US); Evan Butcher, Manchester, CT (US); Lexia Kironn, Rocky Hill, CT (US); Gary A. Schirtzinger, Glastonbury, CT (US); Joe Ott, Enfield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/026,674

(22) PCT Filed: Sep. 24, 2014

(86) PCT No.: PCT/US2014/057126
§ 371 (c)(1),
(2) Date: Apr. 1, 2016

(87) PCT Pub. No.: WO2015/053940
PCT Pub. Date: Apr. 16, 2015

(65) Prior Publication Data
US 2016/0245710 A1  Aug. 25, 2016

Related U.S. Application Data

(60) Provisional application No. 61/887,722, filed on Oct. 7, 2013.

(51) Int. Cl.
*G01L 1/22* (2006.01)
*F16F 1/02* (2006.01)
(Continued)

(52) U.S. Cl.
CPC .............. *G01L 1/22* (2013.01); *B22F 3/1055* (2013.01); *B22F 3/1118* (2013.01); *B22F 5/10* (2013.01);
(Continued)

(58) Field of Classification Search
CPC .. A43B 13/20; G01L 1/22; F16H 7/02; B29C 67/0077; B29C 53/822; B29C 70/38;
(Continued)

(56) References Cited

U.S. PATENT DOCUMENTS 6,112,804 A     9/2000  Sachs et al.
8,904,904 B2 *  12/2014 Stewart .................. B29C 70/38
                                            74/579 R (Continued)

FOREIGN PATENT DOCUMENTS

EP        2564713 A1    3/2013
WO   WO2012071477 A2    5/2012
WO   WO2015042089 A1    3/2015

OTHER PUBLICATIONS

International Search Report and Written Opinion for Application Serial No. PCT/US2014/057126 , dated Jan. 7, 2015, 11 pages.
(Continued)

Primary Examiner — Lisa Caputo
Assistant Examiner — Octavia Hollington
(74) Attorney, Agent, or Firm — Kinney & Lange, P.A.

(57) ABSTRACT

A method includes designing a part. The part includes at least one internal structure. The internal structure is designed to provide strain mitigation, energy dissipation, or impact resistance for the part during an emergency condition. The part is built by a layer-by-layer additive manufacturing process. While building the part, the internal structure is connected to the part.

15 Claims, 4 Drawing Sheets

(51) Int. Cl.
    *F16F 7/12*     (2006.01)
    *B22F 3/105*     (2006.01)
    *B22F 7/06*     (2006.01)
    *B33Y 80/00*     (2015.01)
    *B22F 5/10*     (2006.01)
    *B22F 3/11*     (2006.01)
    *B22F 7/08*     (2006.01)
    *B29C 64/153*     (2017.01)
    *B33Y 10/00*     (2015.01)

(52) U.S. Cl.
    CPC .................. *B22F 7/06* (2013.01); *B22F 7/08* (2013.01); *B29C 64/153* (2017.08); *B33Y 80/00* (2014.12); *F16F 1/025* (2013.01); *F16F 7/12* (2013.01); *B22F 2003/1056* (2013.01); *B29K 2995/0089* (2013.01); *B33Y 10/00* (2014.12); *Y02P 10/295* (2015.11)

(58) Field of Classification Search
    CPC ........... B29C 53/585; F16F 1/025; F16F 7/12; B33Y 80/00; B22F 3/1055; B22F 5/10; B22F 7/06

USPC ..................................................... 73/862.627
    See application file for complete search history.

(56) References Cited

U.S. PATENT DOCUMENTS

| | | | |
|---|---|---|---|
| 9,440,397 B1* | 9/2016 | Fly | B29C 67/0051 |
| 2006/0056960 A1 | 3/2006 | Sabol et al. | |
| 2010/0291401 A1 | 11/2010 | Medina et al. | |
| 2012/0216670 A1 | 8/2012 | McDonald et al. | |
| 2013/0171019 A1 | 7/2013 | Gessler et al. | |
| 2015/0077215 A1* | 3/2015 | Ranky | B29C 70/88 338/47 |
| 2015/0306664 A1* | 10/2015 | Klint | B28B 1/001 419/23 |

OTHER PUBLICATIONS

Supplementary European Search Report for EP Application No. 14851553.9, dated Jun. 23, 2017, 9 Pages.

* cited by examiner

ADDITIVELY GROWN ENHANCED IMPACT RESISTANCE FEATURES FOR IMPROVED STRUCTURE AND JOINT PROTECTION

BACKGROUND

This invention relates generally to the field of additive manufacturing. In particular, the present disclosure relates to internal structures of additive manufactured articles.

Additive manufacturing is an established but growing technology. In its broadest definition, additive manufacturing is any layerwise construction of articles from thin layers of feed material. Additive manufacturing may involve applying liquid, layer, or particle material to a workstage, then sintering, curing, melting, and/or cutting to create a layer. The process is repeated up to several thousand times to construct the desired finished component or article.

Critical joints in aircraft engines, airframes, automobiles, and other structures must be designed to carry both limit and ultimate loads under static and dynamic loading conditions. In certain emergency conditions the load on critical joints can spike in such a manner and to such a degree that catastrophic failure may occur.

SUMMARY

A method includes designing a part that includes at least one internal structure. The internal structure is designed to provide strain mitigation, energy dissipation, or impact resistance for the part during an emergency condition. The part is built by a layer-by-layer additive manufacturing process. While building the part, the internal structure is connected to the part.

An apparatus includes a part designed for and built by a layer-by-layer additive manufacturing process. The part includes an internal structure integrally formed to the part. The internal structure is designed to provide strain mitigation, energy dissipation, or impact resistance for the part during an emergency condition.

DETAILED DESCRIPTION

Figure 1:
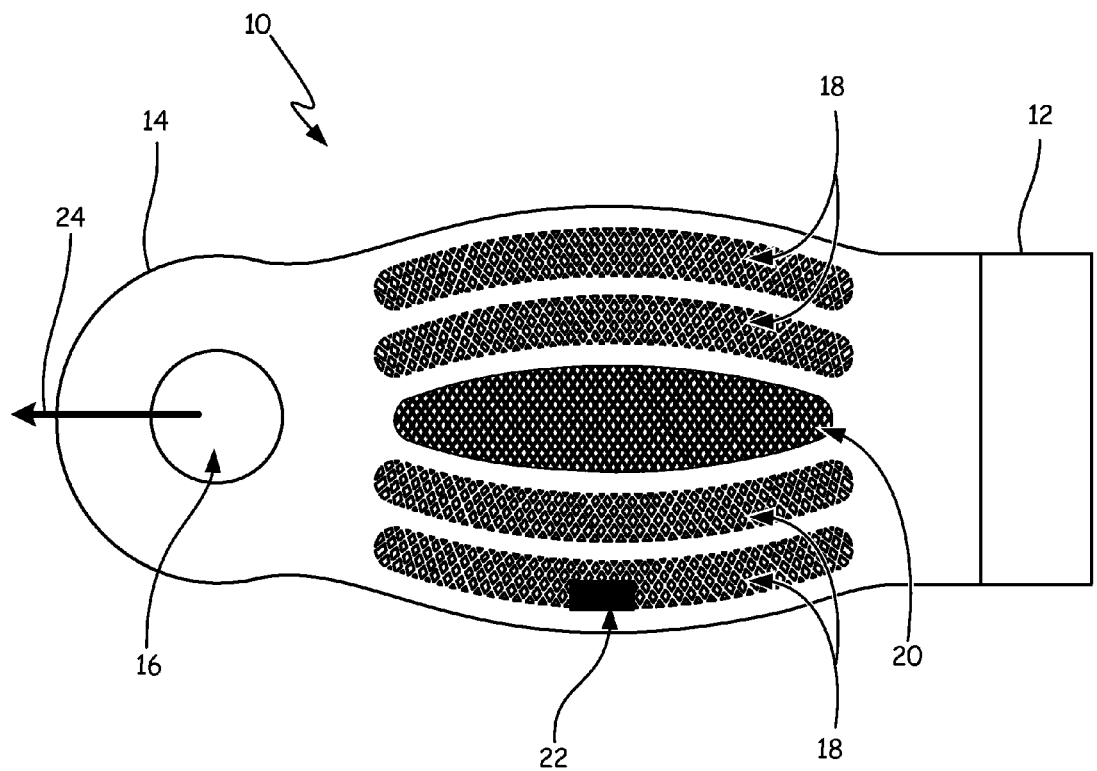
FIG. 1 is a cross-sectional view of a strut end fitting.

FIG. 1 is a cross-sectional view of strut end fitting 10. Strut end fitting 10 includes strut end 12 and joint 14. Joint 14 is connected to strut end 12 at a first end of joint 14. Aperture 16 is located in a second end of joint 14, the second end of joint 14 being opposite from the first end of joint 14. Joint 14 includes first enhanced impact resistance structure 18 and second enhanced impact resistance structure 20. Each of strut end 12, joint 14, first enhanced impact resistance structure 18, and second enhanced impact resistance structure 20 are integrally formed together during an additive manufacturing process. The additive manufacturing process may include powder based, selective laser sintering, or free-form additive manufacturing. Strut end fitting 10 can be made of metallic, polymer, composite, or other materials.

Strut end fitting 10 also includes sensor 22. Sensor 22 is located within first enhanced impact resistance structure 18. Sensor 22 is added to strut end fitting 10 either during or after the additive manufacturing process used to build strut end fitting 10. Sensor 22 is designed to monitor stress experienced by strut end fitting 10. During an emergency event or other stressful conditions, sensor 22 indicates when strut end fitting 10 has suffered plastic and/or elastic deformation. Sensor 22 may include a strain gauge, frangible conducting element, capacitive proximity sensor, or other sensors.

Under normal use conditions, strut end fitting 10 experiences force 24. Force 24 represents a common load direction experienced by end strut fitting 10. Factors such as the direction and amount of force 24 dictate the specific geometry and material selection for enhanced impact resistance structures 18 and 20.

For instance, enhanced impact resistance structure 18 of strut end fitting 10 includes a matrix shaped geometry that contains larger sized voids than the matrix shape geometric structure of enhanced impact resistance structure 20. The smaller sized voids of enhanced impact resistance structure 20 provide a decreased amount of elastic deformation. During an event, enhanced impact resistance structure 20 deforms less than enhanced impact resistance structure 18, thus providing a more structurally strong impact resistance region than enhanced impact resistance structure 18. Enhanced impact resistance structure 18, with its larger sized voids, allows for more plastic and elastic deformation of strut end fitting 10 during an event than does enhanced impact resistance structure 20. The increased distances between the vertices of enhanced impact resistance structure 18 allows for enhanced impact resistance structure 18 to absorb more force and to plastically or elastically deform before a failure of the material. In this embodiment, the geometry of enhanced impact resistance structure 20 is designed to allow for less plastic or elastic deformation because enhanced impact resistance structure 20 is co-axial with the core of strut end fitting 10. During a failure event, it is important that a portion of strut end fitting 10 maintains a region that does not plastically or elastically deform to a large degree. The smaller voids of enhanced impact resistance structure 20 allow for a smaller degree of deformation of strut end fitting 10, therefore providing strut end fitting 10 structural strength in the instance of a failure event.

Additionally, the internal structure of enhanced impact resistance structures 18 and 20 may include a pocket, rib, strut, blade, truss matrix, honeycomb, gradient honeycomb, cellular element, shear core, or spring element.

Enhanced impact resistance structures 18 and 20 offers tailored radial stiffness and enhanced protection against catastrophic failure from extreme transient loads during an emergency condition in critical joints for aircraft engines, airframes, automobiles, and other structures. The structures and material suites in regions of critical structural joints incorporate additive manufacturing design features to mitigate strain rate, dissipate energy, and generally extend the magnitude of elastic and plastic deformation the joint can tolerate before catastrophic failure. Factors such as spring rate, material ductility, energy absorption capacity, allowable deformation, and operating temperature will also dictate specific geometry and material selection for joint 14 and enhanced impact resistance structures 18 and 20. Examples of materials to be used for strut end fitting 10 may include metallic, polymer, or composite materials.

Failure events of part assemblies including strut end fitting 10 can include events with mild load spikes and/or severe load spikes. An example of a mild load spike can include an event involving an automobile. Failure events suffered by automobiles often cause mild load spikes in part assemblies causing elastic deformation of parts. Strut end fitting 10 with enhanced impact resistance structures 18 and 20 would allow an automotive part to experience a mild load spike while only elastically deforming. Without enhanced impact resistance structures 18 and 20, an automobile part would likely suffer plastic deformation resulting in catastrophic failure of the part. Examples of a severe load spike may include an airplane crash, clear air turbulence, blade out event, disk rupture, ballistic impact, and other events. In an airplane crash or ballistic event, damage to an airplane often results in plastic deformation of the part. In these events, enhanced impact resistance structures 18 and 20 allow an airplane part to experience a severe load spike while only plastically deforming. Without enhanced impact resistance structures 18 and 20, an airplane part would likely suffer splintering, shattering, or destruction resulting in catastrophic failure of the part.

Additive manufacturing processes allow complex geometries of enhanced impact resistance structures to be achieved which may not be economically feasible with non-additive manufacturing processes. Additive manufacturing processes eliminate the need to employ commonly expensive non-additive manufacturing processes of forming enhanced impact resistance structures after the build of the part. Additionally, non-additive manufacturing processes used to create complex geometries can become very expensive. Enhanced impact resistance structures integrally formed within the part, made possible by additive manufacturing processes, enable fewer raw materials to be used therefore decreasing the weight of the part, while providing a crumple zone allowing for elastic and plastic deformation of the part. The decreased amount of raw materials also provides a lower-cost alternative to parts with a solid structure.

Figure 2:
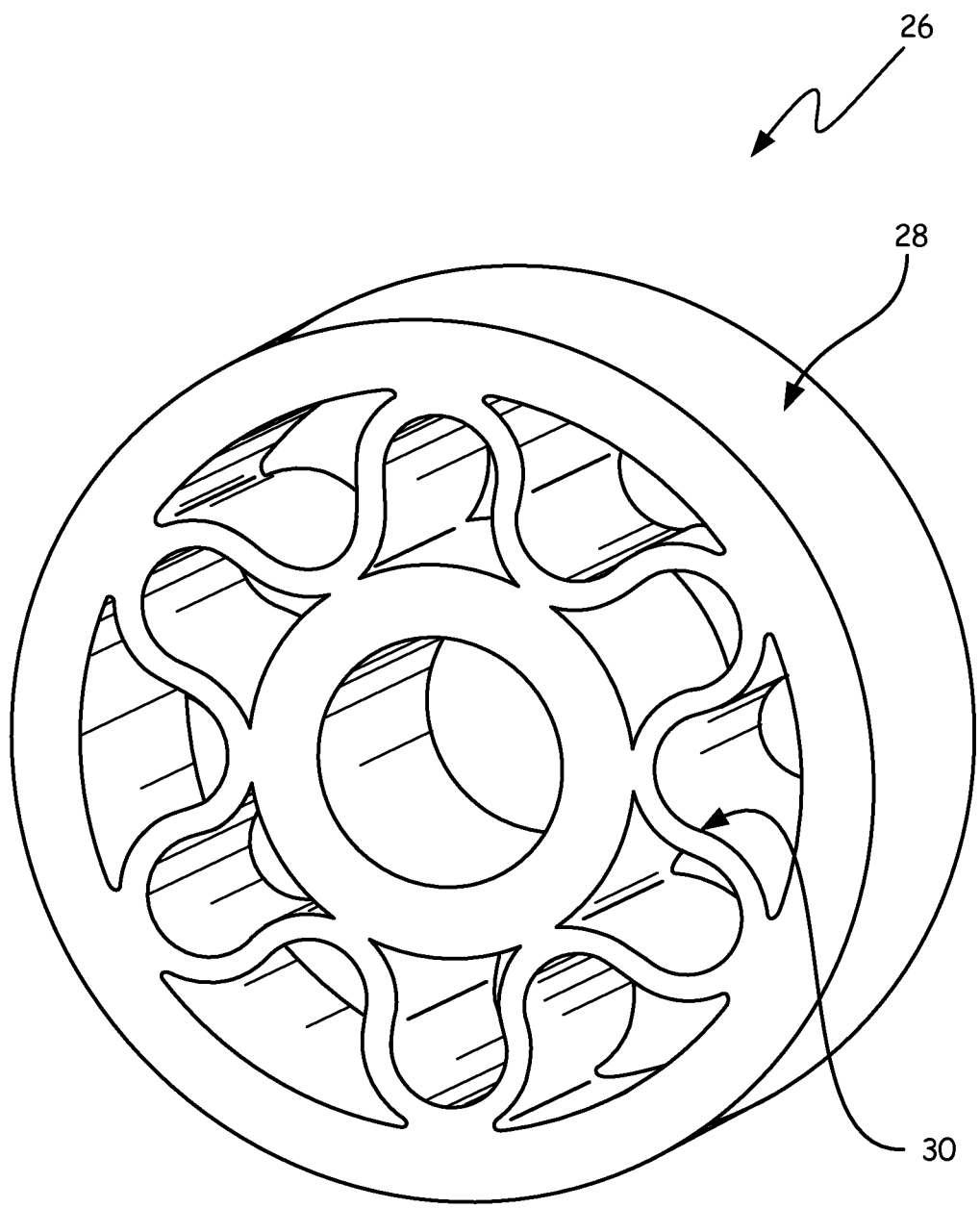
FIG. 2 is a perspective cross-sectional view of a first bolt bushing.

FIG. 2 is a perspective cross-sectional view of bolt bushing 26. Bolt bushing 26 includes external structure 28 and enhanced impact resistance structure 30. External structure 28 defines an outer wall of bolt bushing 26. Enhanced impact resistance structure 30 is located within external structure 28. Enhanced impact resistance structure 30 is integrally formed to external structure 28 through an additive manufacturing process.

External structure 28 circumferentially surrounds bolt bushing 26 and includes a relatively constant thickness for the entire portion of external structure 28. The thickness of external structure 28 can be designed to allow for a desired degree of deformation depending on the environment in which bolt bushing 26 will be used. For example, a smaller thickness of external structure could allow for a greater range of plastic or elastic deformation of external structure 28, whereas a thicker external structure 28 would allow for a lesser range of plastic or elastic deformation of external structure 28.

Enhanced impact resistance structure 30 allows for plastic and/or elastic deformation of bolt bushing 26 during failure events during in-use conditions in automobiles, aircraft, or other vehicles. The structure of enhanced impact resistance structure 30 includes a curved rib structure in the shape of a waveform that extends along an inside circumference of external structure 28. The nodes of enhanced impact resistance structure 30 connect to the inside circumference of external structure 28. The distance between and frequency of successive nodes of enhanced impact resistance structure 30 is designed based upon desired plastic or elastic deformation response capability of bolt bushing 26. For instance a small amount of nodes in enhanced impact resistance structure 30 increases the distance between successive nodes. This would allow for more plastic or elastic deformation to be experienced by external structure 28 due to there being more spacing between the contact points of the successive nodes and external structure 28. In an additional instance, a large amount of nodes in enhanced impact resistance structure 30 decreases the distance between successive nodes. The decreased distance between successive nodes would allow for less plastic or elastic deformation to be experienced by external structure 28 due to there being less spacing between the contact points of the successive nodes and external structure 28.

Figure 3:
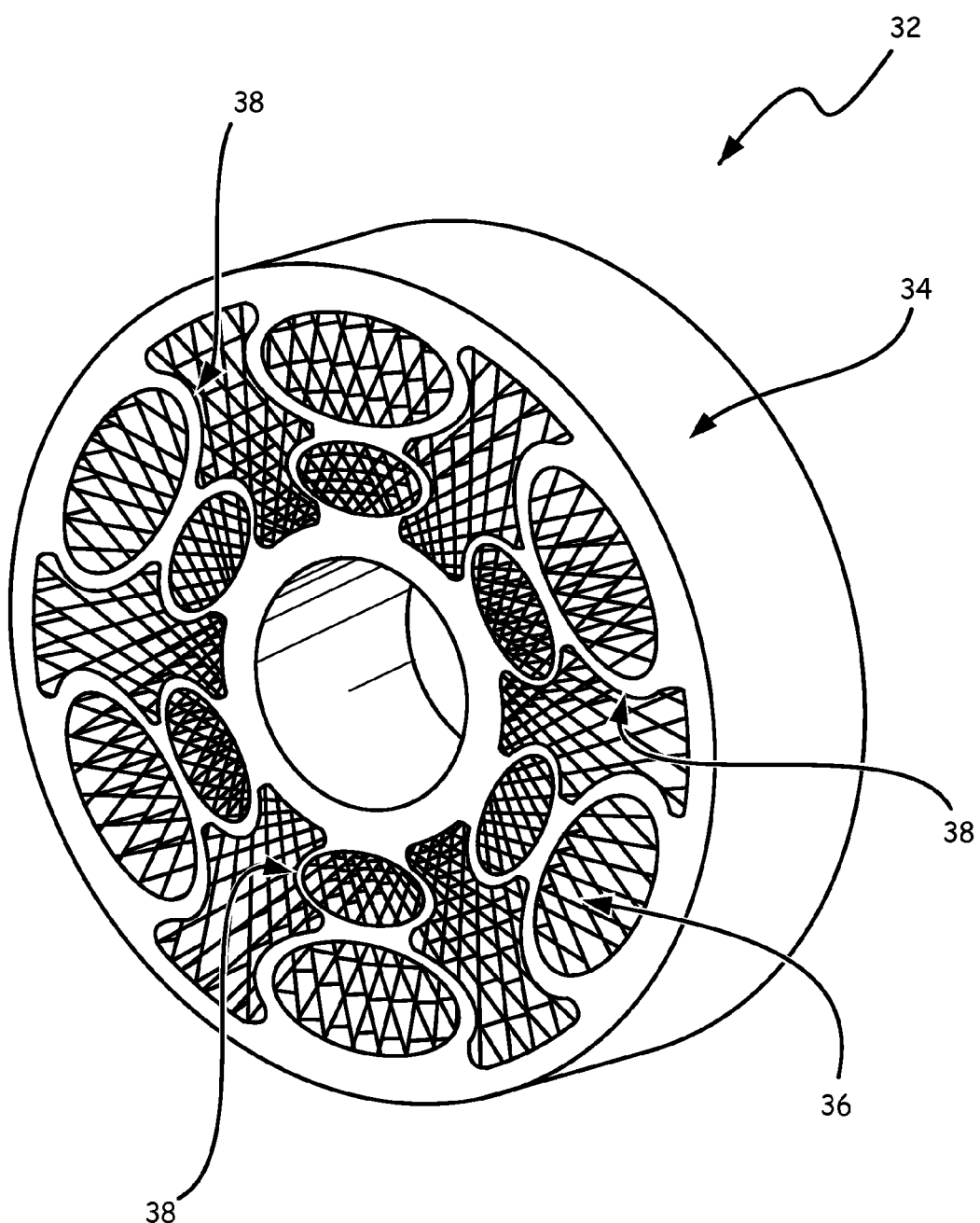
FIG. 3 is a perspective cross-sectional view of a second bolt bushing.

FIG. 3 is a perspective cross-sectional view of bolt bushing 32. Bolt bushing 32 includes external structure 34, enhanced impact resistance structure 36, spring elements 38. External structure 34 defines an outer wall of bolt bushing 32. Enhanced impact resistance structure 36 is located within external structure 34. Enhanced impact resistance structure 36 is integrally formed to external structure 34 through an additive manufacturing process. Spring elements 38 are located within bolt bushing 32 and are integrally formed with external structure 34 and enhanced impact resistance structure 36 through an additive manufacturing process.

External structure 34 circumferentially surrounds bolt bushing 32 and includes a relatively constant thickness for the entire portion of external structure 34. The thickness of external structure 34 can be designed to allow for a desired degree of deformation depending which environment in which bolt bushing 32 will be used. For example, a smaller thickness of external structure could allow for a greater range of plastic or elastic deformation of external structure 34, whereas a thicker external structure 34 would allow for a lesser range of plastic or elastic deformation of external structure 34.

Enhanced impact resistance structure 36 includes a gradient honeycomb formation. The gradient honeycomb formation of enhanced impact resistance structure 36 includes a large number of contact points with external structure 34 which provide a large degree of structural support for bolt bushing 32 and to external structure 34. Another feature of the gradient honeycomb formation of enhanced impact resistance structure 36 involves decreasing the size of the voids within the gradient honeycomb formation of enhanced impact resistance structure 36 as the radial distance from external structure 34 increases. This gradient transition of the gradient honeycomb formation of enhanced impact resistance structure 36 allows for more plastic or elastic deformation nearer external structure 34 due to the larger size of the honeycomb voids. Closer towards the center of bolt bushing 32, the voids of the gradient honeycomb formation of enhanced impact resistance structure 36 are smaller allowing for less plastic or elastic deformation nearer the center of bolt bushing 32 due to the smaller size of the honeycomb voids.

In addition to enhanced impact resistance structure 36, spring elements 38 provides an additional energy absorbing feature to bolt bushing 32. Spring elements 38 are oval shaped to help absorb forces experienced by bolt bushing 32 during a failure event and allow for a higher degree of elastic deformation of bolt bushing 32 before a catastrophic failure occurs. Spring elements 38 help to absorb radial, normal, and other forces placed upon external structure 34 during events.

Other embodiments of bolt bushing 32 may include a pocket, rib, strut, blade, honeycomb, truss matrix, cellular element, or shear core in place of or in addition to enhanced impact resistance structure 36 and spring elements 38.

Enhanced impact resistance structure 36 and spring elements 38 allow for plastic and/or elastic deformation of bolt bushing 32 during failure events during in-use conditions in automobiles, aircraft, or other vehicles.

Figure 4:
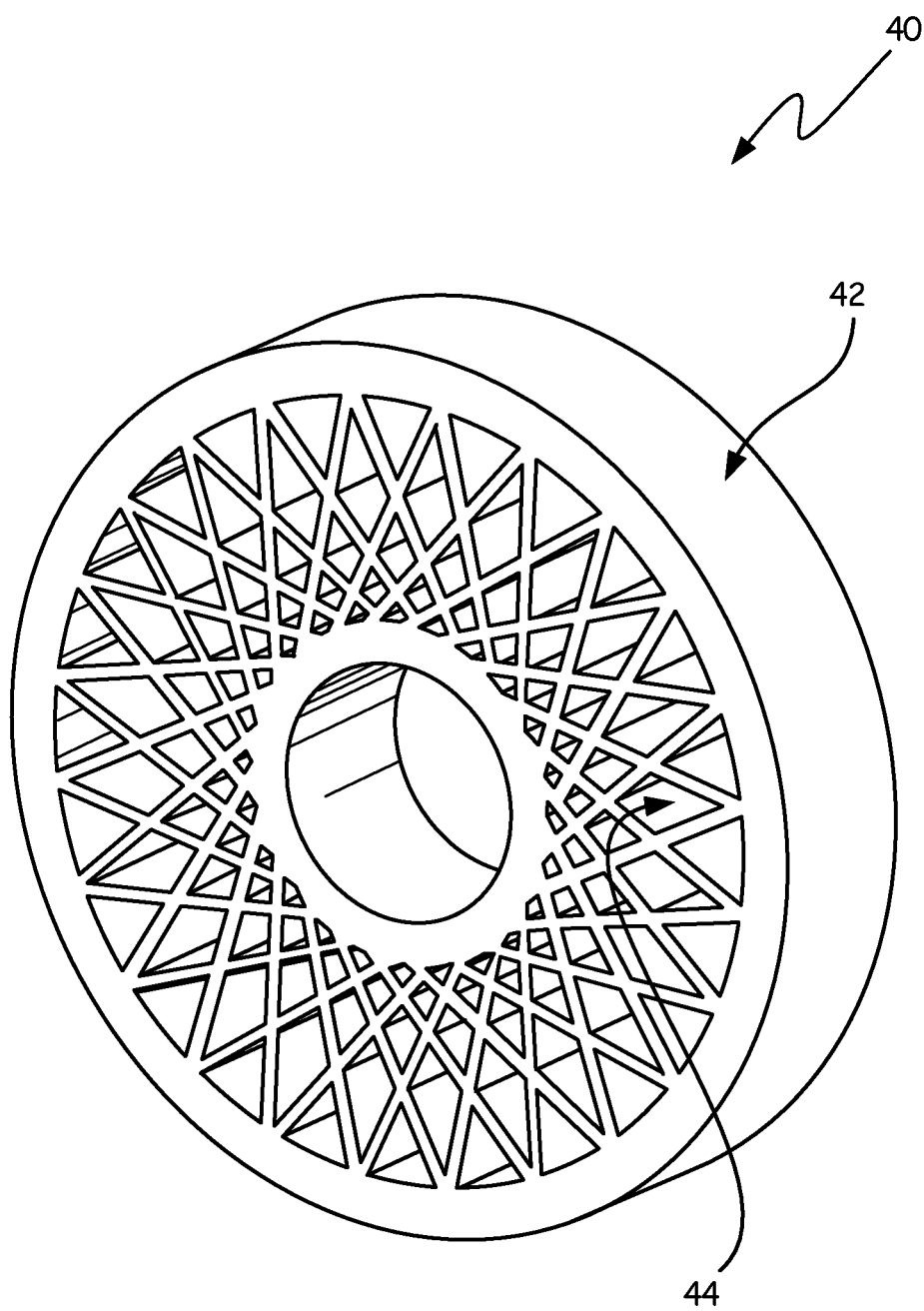
FIG. 4 is a perspective cross-sectional view of a third bolt bushing.

FIG. 4 is a perspective cross-sectional view of bolt bushing 40. Bolt bushing 40 includes external structure 42 and enhanced impact resistance structure 44. External structure 42 defines an outer wall of bolt bushing 40. Enhanced impact resistance structure 40 is located within external structure 42. Enhanced impact resistance structure 40 is integrally formed to external structure 42 through an additive manufacturing process.

External structure 42 circumferentially surrounds bolt bushing 40 and includes a relatively constant thickness for the entire portion of external structure 42. The thickness of external structure 42 can be designed to allow for a desired degree of deformation depending which environment in which bolt bushing 40 will be used. For example, a smaller thickness of external structure could allow for a greater range of plastic or elastic deformation of external structure 42, whereas a thicker external structure 42 would allow for a lesser range of plastic or elastic deformation of external structure 42.

Enhanced impact resistance structure 44 includes a gradient honeycomb formation. The gradient honeycomb formation of enhanced impact resistance structure 44 includes a large number of contact points with external structure 42 which provide a large degree of structural support for bolt bushing 40 and to external structure 42. Another feature of the gradient honeycomb formation of enhanced impact resistance structure 44 involves decreasing the size of the voids within the gradient honeycomb formation of enhanced impact resistance structure 44 as the radial distance from external structure 42 increases. This gradient transition of the gradient honeycomb formation of enhanced impact resistance structure 44 allows for more plastic or elastic deformation nearer external structure 42 due to the larger size of the honeycomb voids. Closer towards the center of bolt bushing 40, the voids of the gradient honeycomb formation of enhanced impact resistance structure 44 are smaller allowing for less plastic or elastic deformation nearer the center of bolt bushing 40 due to the smaller size of the honeycomb voids.

Other embodiments of bolt bushing 40 may include a pocket, rib, strut, blade, honeycomb, truss matrix, cellular element, or shear core in place of or in addition to enhanced impact resistance structure 44.

Enhanced impact resistance structure 42 allows for plastic and/or elastic deformation of bolt bushing 40 during failure events during in-use conditions in automobiles, aircraft, or other vehicles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
designing a part to include at least one internal structure, wherein the at least one internal structure is designed to provide strain mitigation, energy dissipation, or impact resistance for the part during an emergency condition, wherein the part comprises a strut end fitting or bolt bushing for use in an aircraft engine, airframe, or automobile, wherein the internal structure includes voids, and further wherein a size of the voids increases or decreases as a distance from the voids to a center of the part increases, wherein the internal structure further comprises a pocket, rib, strut, blade, truss matrix, honeycomb, gradient honeycomb, cellular element, shear core, or spring element;
building the part by a layer-by-layer additive manufacturing process; and
connecting, while building the part, the internal structure to the part.

2. The method of claim 1, wherein the part comprises a metallic, polymer, or composite material.

3. The method of claim 1, wherein the layer-by-layer additive manufacturing process comprises powder based, selective laser sintering, or free-form additive manufacturing.

4. The method of claim 1, wherein the internal structure increases at least one of elastic deformation or plastic deformation the part can tolerate during the emergency condition.

5. The method of claim 4, wherein the emergency condition comprises a crash, clear air turbulence, blade out event, disk rupture, or ballistic impact of the aircraft engine, airframe, or automobile.

6. The method of claim 1 further comprising disposing a sensor in the internal structure during the additive manufacturing process, the sensor for measuring a strain rate experienced by the part.

7. The method of claim 6, wherein the sensor comprises a strain gauge, frangible conducting element, or capacitive proximity sensor.

8. An apparatus comprising:
a part designed for and built by a layer-by-layer additive manufacturing process, wherein the part comprises a strut end fitting or bolt bushing for use in an aircraft engine, airframe, or automobile;
an internal structure disposed within the part, wherein the internal structure is integrally formed to the part and is designed to provide strain mitigation, energy dissipation, or impact resistance for the part during an emergency condition, and
a sensor disposed in the internal structure during the additive manufacturing process, the sensor for measuring a strain rate experienced by the part.

9. The apparatus of claim 8, wherein the part comprises a metallic, polymer, or composite material.

10. The apparatus of claim 8, wherein the layer-by-layer additive manufacturing process comprises powder based, selective laser sintering, or free-form additive manufacturing.

11. The apparatus of claim 8, wherein the internal structure further comprises a pocket, rib, strut, blade, truss matrix, honeycomb, gradient honeycomb, cellular element, shear core, or spring element.

12. The apparatus of claim 11, wherein the internal structure includes voids, and further wherein a size of the voids increases or decreases with increasing distance from a center of the part the voids are located.

13. The apparatus of claim 8, wherein the internal structure increases at least one of elastic deformation or plastic deformation the part can tolerate during the emergency condition.

14. The apparatus of claim 13, wherein the emergency condition comprises a crash, clear air turbulence, blade out event, disk rupture, or ballistic impact of the aircraft engine, airframe, or automobile.

15. The apparatus of claim 8, wherein the sensor comprises a strain gauge, frangible conducting element, or capacitive proximity sensor.

\* \* \* \* \*